UNITED STATES PATENT OFFICE.

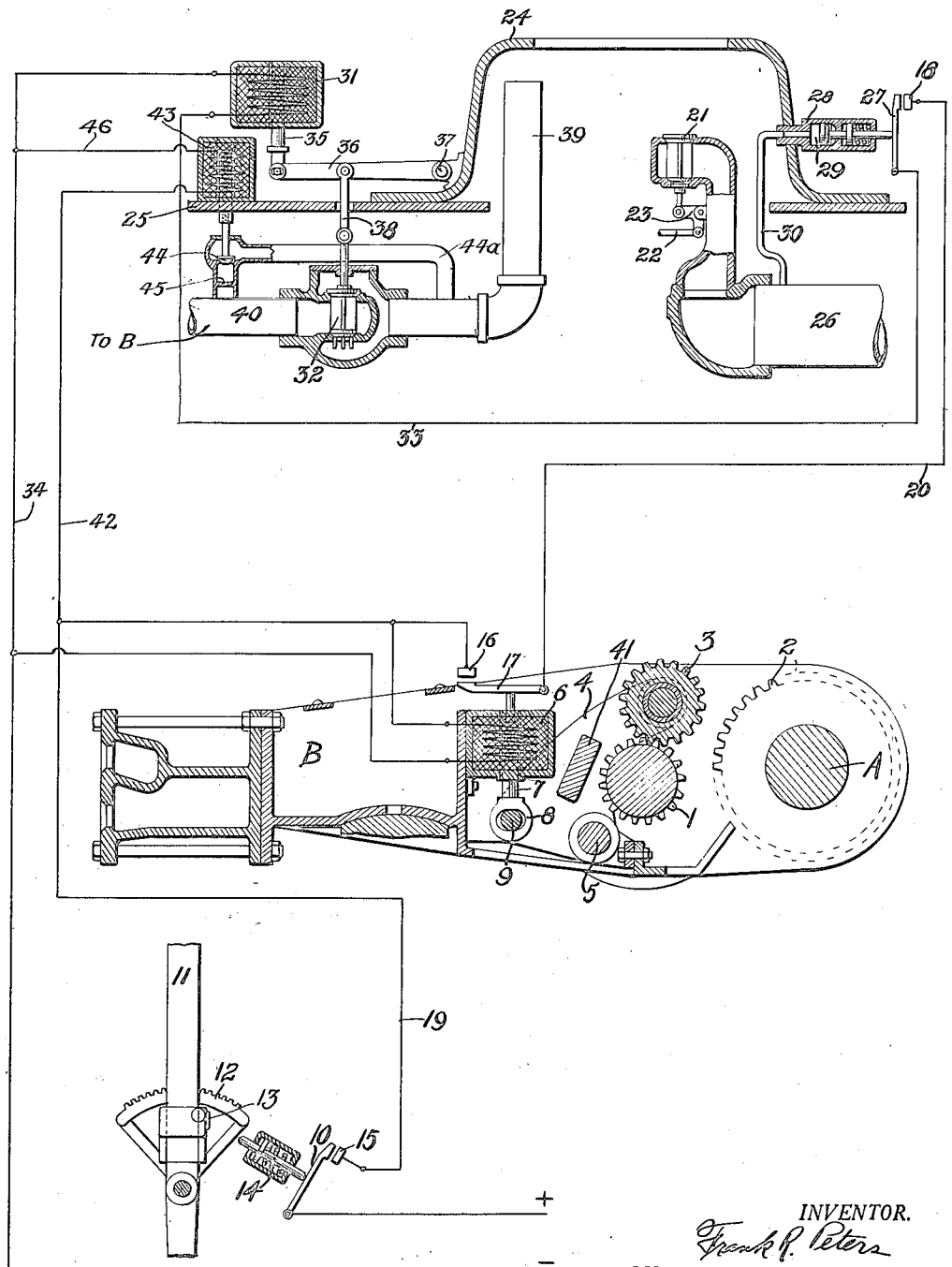

FRANK R. PETERS, OF NEW YORK, N. Y., ASSIGNOR TO FRANKLIN RAILWAY SUPPLY COMPANY, A CORPORATION OF DELAWARE.

CONTROLLING MECHANISM FOR LOCOMOTIVE BOOSTER MOTORS.

1,425,277.  Specification of Letters Patent.  Patented Aug. 8, 1922.

Application filed December 13, 1921. Serial No. 522,061.

*To all whom it may concern:*

Be it known that I, FRANK RICHARD PETERS, a subject of the King of Great Britain, residing in the city of New York, county of New York, and State of New York, United States of America, have invented certain new and useful Improvements in Controlling Mechanism for Locomotive Booster Motors, of which the following is a specification.

This application relates to locomotive booster motors of the general character illustrated in Mr. Howard L. Ingersoll's pending renewal application, Serial Number 359,201, filed February 16, 1920 and in Patent Number 1,339,395, issued to the same man on May 11, 1920 and it has for its principal object the provision of an improved and simplified controlling mechanism for such booster motors. Specifically stated my improvement consists in providing electrically operated means for controlling the booster motor.

In order to clearly understand the present invention it should be borne in mind that a booster motor of the character described is designed to drive the normally idle wheels of a locomotive trailer truck. Due to the small size of such wheels the booster motor is intended to be operated only at low speeds of the locomotive, from zero to approximately ten or twelve miles per hour. Mechanism for entraining and disentraining the booster motor is therefore provided in addition to throttle mechanism for controlling the supply of steam thereto. The cycle of operation is as follows: Before the locomotive starts or at least before any appreciable speed is attained, the entraining mechanism is operated to connect the booster motor to the axle of the trailer wheels after which and subsequent to the admission of operating steam to the main cylinders of the locomotive, steam in sufficient quantities to operate the booster motor is admitted to the cylinders thereof. When the limit of speed has been attained the booster motor is disentrained and the supply of steam thereto shut off.

With the foregoing brief description of the function and operation of a booster motor the object of my invention can be stated as consisting in the provision of electrically operated apparatus for entraining the booster motor and for controlling the supply of steam thereto.

The accompanying drawing diagrammatically illustrates my improvement, the single figure illustrating the parts with the idea of clearly illustrating their functions but with no attempt having been made to show them in actual operative relation to one another.

The booster motor indicated as a whole by the reference character B is designed to drive the trailer truck axle A through the medium of the pinion 1, gear 2 and idler gear 3, the latter of which is mounted upon the member 4 for swinging movement on the pivot 5. The cylinders of the booster motor B are arranged to drive the pinion 1 and the idler 3 is at all times in mesh with this pinion. Upon movement to the right of the idler gear supporting member 4, said idler gear is placed in mesh with the axle gear 2, the booster motor being then entrained and ready to drive said axle.

The supporting member 4 is rocked around the pivot 5 by means of an electromagnetic device 6, the core 7 of which is connected by means of the eye 8 to the pin 9 carried by the member 4. The circuit for this electromagnetic device is normally broken at the switch 10.

Inasmuch as it is never intended to operate the booster motor except in conjunction with the main driving means of the locomotive it is highly desirable that the electromagnetic operating means for the entraining device be under the control of some part or parts of the main driving mechanism of the locomotive. I have therefore shown what I deem to be a preferred arrangement for controlling the switch 10 and the circuit of the electromagnetic device 6 which involves the use of the locomotive reverse lever 11. In starting the locomotive this reverse lever is moved into the corner, as it is colloquially expressed, of the quadrant 12 in which position the abutment or projection 13 is adapted to depress the spring held plunger 14 to make contact between the switch 10 and the contact piece 15. This completes the circuit of the electromagnetic device 6 and the member 4 is rocked to the right to place the idler gear 3 in mesh with driving gear 2. The booster motor is now entrained and ready to drive the axle A upon admission of steam to its operating cylinders.

The circuit of the electromagnet 6 leads from positive source, over 10, 15, 19, 6, 34 to negative source.

At the same time that this entrainment is accomplished contact is made between the contact piece 16 and the switch arm 17 so that current can be brought to the contact piece 18 through the medium of the wires 19 and 20 for a purpose to be now described.

After the reverse lever has been moved into the corner the next step in the normal operation of a locomotive is the opening of the main throttle valve 21. This can be accomplished in the well known manner through the medium of the throttle lever (not shown) and the rod 22 and bell crank 23. This throttle valve is situated within the dome 24 located on top of the locomotive boiler 25. Opening of the throttle 21 admits steam to the dry pipe 26 from which it is conducted to the main cylinders of the locomotive not shown. The pressure of this live or operating steam is utilized to move the switch arm 27 into contact with the contact piece 18 through the medium of the piston and cylinder mechanism 28 projecting from the side of the dome 24. The piston of this mechanism is normally spring held in open position as shown but upon introduction of pressure into the chamber 29 through the connecting pipe 30, it is moved to the right or in a direction to close the switch. This completes the circuit to the operating electromagnet 31 of the booster throttle valve 32 through the medium of wires 33 and 34. The circuit of electromagnet 31 leads from positive source, over 10, 15, 19, 16, 17, 18, 27, 31, 34 to negative source. The core 35 of the electromagnetic device 31 moves the arm 36 upwardly around its pivot 37 and operates the throttle 32 through the medium of the link 38. It should be borne in mind that this showing is entirely diagrammatic and that in actual practice suitable provision would be made for packing the joint through the boiler 25. When the booster throttle valve 32 is thus opened steam from the dome passes down through the pipes 39 and 40 to the cylinders of the booster motor B.

As soon as the locomotive gains somewhat in speed it is customary for the engineer to pull back or "hook up" the reverse lever 11. As soon as he does this the plunger 14 will be moved by means of its spring to open the switch 10 and thereby break the circuit to the entraining mechanism and also to the booster throttle valve operating mechanism. The weight 41 will aid in moving the supporting member 4 to its normal or inoperative position.

It should be noted that the engine may still be in operation but above a certain speed, say for example ten to twelve miles per hour, it is working expansively with the reverse lever 11 hooked up. Contact may still exist between switch arm 27 and contact piece 18 but no current can reach the booster throttle operating electromagnetic device 31 until such time as the speed of the locomotive sufficiently decreases to warrant the engineer in moving the reverse lever to its extreme forward position where it will make contact between switch 10 and contact piece 15 to entrain the booster motor as previously described.

In connection with the entrainment of the booster it is desirable to have the pinion 1 and the idler 3 rotating at an easy speed because this will insure a more ready meshing of the idler 3 with the gear 2 and to this end I have provided the following mechanism. When the switch 10 is closed the circuit to a solenoid 43 is completed at the same time that the electromagnetic device 6 is actuated. The circuit of electromagnet 43 leads from positive source, over 10, 15, 19, 42, 43, 34 to negative source. This solenoid 43 controls a valve 44 in the by-pass pipe 44ª around the booster throttle 32. When the solenoid 43 is actuated the valve 44 is opened to admit a certain amount of steam, controllable by a preferably adjustable orifice 45, to the cylinders of the booster engine through the main supply pipe 40. This will cause the pinion 1 to drive the idler gear 3 at an easy speed and thus enable proper and ready meshing at all times. The circuit for the solenoid 43 is completed through the wires 42 and 46. The valve 44 is in the nature of a pilot valve and is at no time intended to function as a throttle valve for the booster.

It will, of course, be understood that in applying the foregoing invention many modifications might be introduced without departing from the spirit and scope of the invention as defined in the appended claims.

I claim:

1. A control mechanism for locomotive booster motors comprising in combination, electrically actuated booster entraining mechanism, means for closing the circuit to said entraining mechanism upon actuation of the locomotive valve motion, an electrically actuated booster throttle, and means under the control of live operating steam for closing the circuit of said booster throttle, said booster throttle circuit being under the control of the booster entraining mechanism.

2. A control mechanism for locomotive booster motors comprising in combination, a booster throttle and electrically operated means for opening said throttle the circuit of which is closed upon admission of live operating steam to the main cylinders of the locomotive.

3. A control mechanism for locomotive booster motors comprising in combination, electrically actuated booster entraining mechanism and means for closing the circuit to said entraining mechanism upon actuation of the locomotive valve motion.

4. In a control mechanism for locomotive booster motors adapted to be entrained and disentrained from a trailer truck axle, the combination of a booster throttle and electrically operated means for opening said throttle the circuit of which is closed upon admission of live operating steam to the main cylinders of the locomotive, said circuit being adapted to be broken upon disentrainment of the booster motor from the axle.

5. A control mechanism for locomotive booster motors comprising in combination, with the locomotive valve motion, an electrically operated booster throttle valve the circuit of which is under the control of the said locomotive valve motion.

6. In a control mechanism for locomotive booster motors adapted to be entrained and disentrained from an axle of the locomotive, the combination of a booster throttle, electrically actuated means for opening said throttle, and means under the control of the main locomotive throttle for closing the circuit of said electrically actuated means.

7. In a control mechanism for locomotive booster motors adapted to be entrained and disentrained from an axle of the locomotive, the combination with the reverse lever, of an electrically actuated entraining mechanism and a switch for closing and opening the circuit of said mechanism, said switch being under the control of the reverse lever.

8. In a control mechanism for locomotive booster motors adapted to be entrained and disentrained from an axle of the locomotive, the combination with the reverse lever, of an electrically actuated booster throttle and a switch for closing and opening the circuit of said electrically actuated throttle said switch being under the control of the reverse lever.

9. In a control mechanism for a locomotive booster motor which is adapted to be entrained and disentrained from an axle of the locomotive, the combination with the booster throttle of electrically actuated means for opening said throttle, electrically actuated means for entraining said booster motor, and means under the control of the main driving mechanism of the locomotive for controlling said two electrically actuated means.

10. In a control mechanism for locomotive booster motors having a geared connection to an axle of the locomotive and adapted to be entrained and disentrained from said axle by movement of a gear, the combination of electrically actuated entraining mechanism and electrically actuated mechanism for preliminarily rotating a gear in the geared connection to insure ready meshing during the entraining operation.

In testimony whereof I have hereunto signed my name.

FRANK R. PETERS.